US011969106B2

(12) United States Patent
Chen (10) Patent No.: US 11,969,106 B2
(45) Date of Patent: Apr. 30, 2024

(54) INTELLIGENT COOKING OPERATION METHOD

(71) Applicant: LIVEON INDUSTRIAL CO., LTD., Yangjiang (CN)

(72) Inventor: Zili Chen, Yangjiang (CN)

(73) Assignee: LIVEON INDUSTRIAL CO., LTD., Yangjiang (CN)

( * ) Notice: Subject to any disclaimer, the term of this patent is extended or adjusted under 35 U.S.C. 154(b) by 714 days.

(21) Appl. No.: 17/059,470

(22) PCT Filed: Feb. 18, 2019

(86) PCT No.: PCT/CN2019/075340
§ 371 (c)(1),
(2) Date: Nov. 30, 2020

(87) PCT Pub. No.: WO2019/227973
PCT Pub. Date: Dec. 5, 2019

(65) Prior Publication Data
US 2021/0204701 A1 Jul. 8, 2021

(30) Foreign Application Priority Data
May 31, 2018 (CN) .......................... 201810551966.2

(51) Int. Cl.
*A47C 7/56* (2006.01)
*A47C 3/20* (2006.01)
(Continued)

(52) U.S. Cl.
CPC ................ *A47C 7/563* (2013.01); *A47C 3/20* (2013.01); *A47J 27/0802* (2013.01);
(Continued)

(58) Field of Classification Search
CPC ........ A47C 3/20; A47C 7/563; A47J 27/0802; A47J 36/321; F24C 15/00; G05B 19/04; G05B 19/042; G05B 2219/2643
(Continued)

(56) References Cited

U.S. PATENT DOCUMENTS

| 2016/0198885 A1* | 7/2016 | Logan | A47J 27/002 99/341 |
| 2018/0020831 A1* | 1/2018 | Lenz | A47C 3/20 297/174 R |
| 2020/0069490 A1* | 3/2020 | Gassner | A47C 31/00 |

FOREIGN PATENT DOCUMENTS

| CN | 102184436 B | 4/2013 |
| CN | 204995681 U | 1/2016 |

(Continued)

*Primary Examiner* — Dana Ross
*Assistant Examiner* — James F Sims, III
(74) *Attorney, Agent, or Firm* — Bayramoglu Law Offices LLC (57) ABSTRACT

An intelligent cooking operation method includes: providing a seat; forming, by a back of the seat, a swing connection by using a connecting rod; forming a lifting and rotating connection between a cushion of the seat and a base of the seat through a support rod; and sending, by a cook, one or more voice control commands of a kitchen appliance to a voice signal receiving module according to a cooking requirement, where a voice command recognition module recognizes the voice control commands and generates corresponding appliance voice command data, and a command transmission module sends a command signal to a command receiving module of the kitchen appliance that the voice control commands point to, to control the kitchen appliance.

2 Claims, 5 Drawing Sheets

(51) Int. Cl.
*A47J 27/08* (2006.01)
*A47J 36/32* (2006.01)
*F24C 15/00* (2006.01)
*G05B 19/042* (2006.01)

(52) U.S. Cl.
CPC ............ *A47J 36/321* (2018.08); *F24C 15/00* (2013.01); *G05B 19/042* (2013.01); *G05B 2219/2643* (2013.01)

(58) Field of Classification Search
USPC .......................................................... 99/325
See application file for complete search history.

(56) References Cited

FOREIGN PATENT DOCUMENTS

| | | | |
|---|---|---|---|
| CN | 105877244 | A | 8/2016 |
| CN | 205568399 | U | 9/2016 |
| CN | 106264065 | A | 1/2017 |
| CN | 106859113 | A | 6/2017 |
| CN | 105572673 | B | 6/2018 |
| CN | 108594719 | B | 11/2020 |
| EP | 3796113 | B1 | 8/2022 |
| KR | 20010077696 | A | 8/2001 |

* cited by examiner

INTELLIGENT COOKING OPERATION METHOD

CROSS REFERENCE TO THE RELATED APPLICATIONS

This application is the national phase entry of International Application No. PCT/CN2019/075340, filed on Feb. 18, 2019, which is based upon and claims priority to Chinese Patent Application No. 201810551966.2, filed on May 31, 2018, the entire contents of which are incorporated herein by reference.

TECHNICAL FIELD

The present invention pertains to the field of cooking technologies, and in particular, relates to an intelligent cooking operation method. The method is based on an intelligent cooking technology and an Internet of Things technology using health big data.

BACKGROUND

Figure 1:
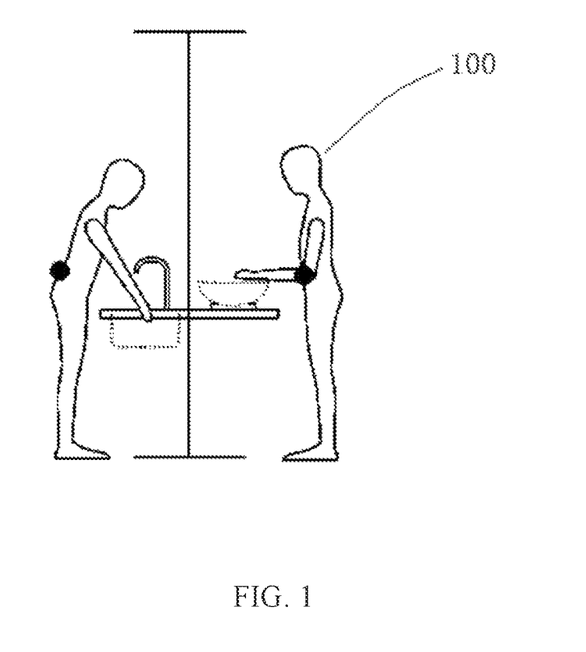
FIG. 1 is a schematic diagram of an existing cooking operation mode of a cook.
Figure 2:
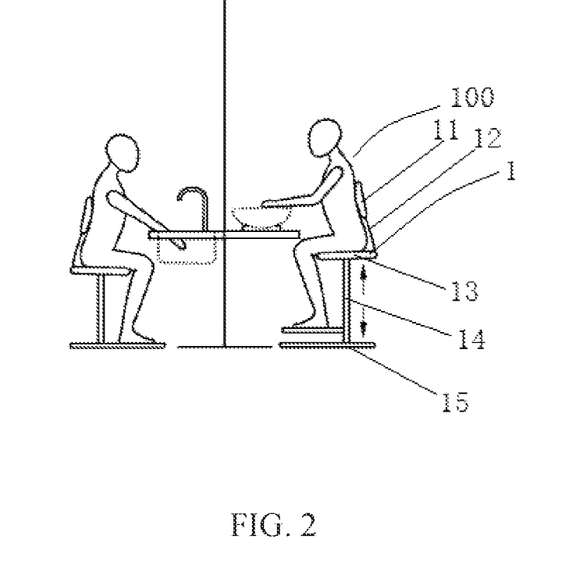
FIG. 2 is a schematic diagram of a cooking operation mode of a cook in an intelligent cooking operation method according to the present invention.
Figure 3A:
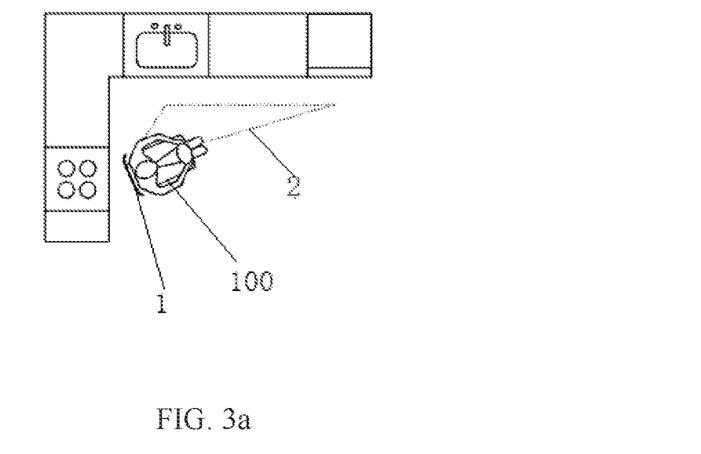
FIG. 3a to FIG. 3d are schematic structural diagrams of a slide rail in an intelligent cooking operation method according to the present invention.
Figure 3B:
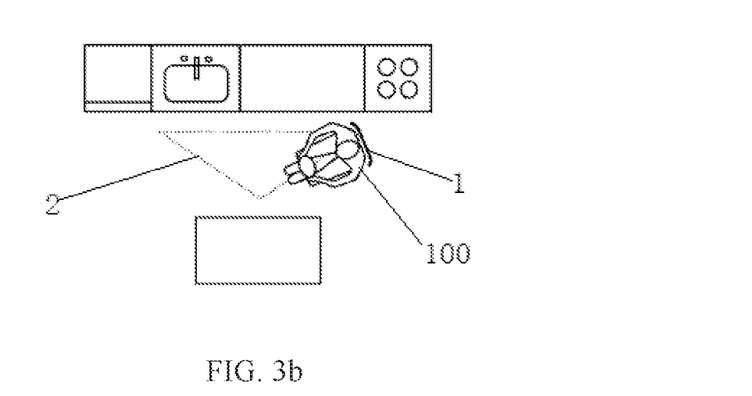
Figure 3C:
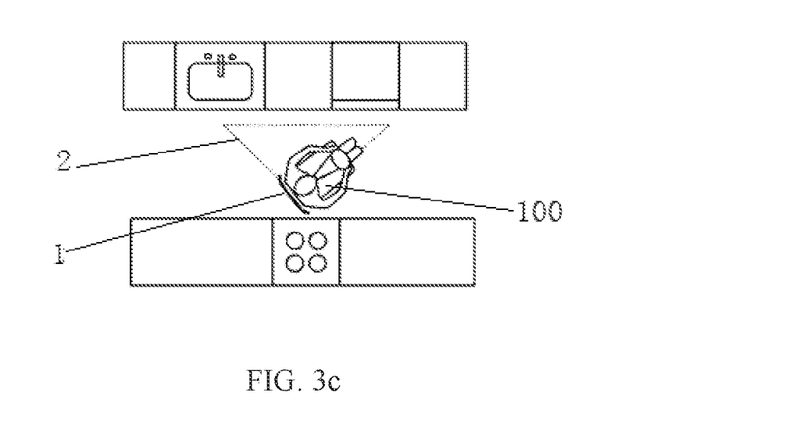
Figure 3D:
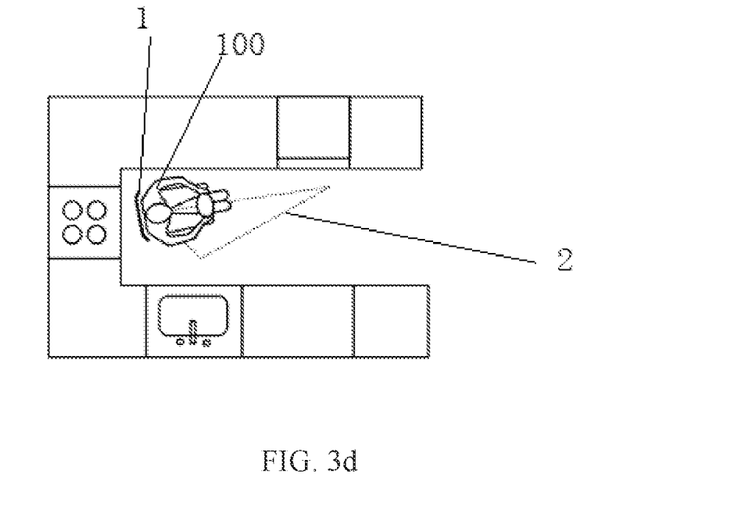

Existing cooking operations are in standing manners. Regardless of a family or the catering industry, an operator experiences a process of taking food, cleaning, processing, and cooking in a standing manner repeatedly for a long time, which causes fatigue and health problems. As shown in FIG. 1, when a cook stands continuously in preparation for food (bending over to wash vegetables and cutting vegetables) or cooking (raising arms for cooking), it is easy to cause fatigue and pain in waist, shoulder, and neck muscles, blood accumulation in lower limbs, swelling in legs, and possible varicose veins. Standing on hard ground for a long time also causes trauma and foot pain.

A seat can make a human body relax, eliminate fatigue, improve efficiency, and effectively avoid or alleviate the foregoing problems caused by cooking in the standing manner. However, introducing a seat into a kitchen causes a lot of inconvenience, and thus people still cook in the kitchen in the standing manner.

Therefore, relevant technicians have developed an intelligent kitchen cooking system, which includes a recommendation unit, a weighing unit, processing equipment and a central processor. The recommendation unit is used to recommend a corresponding menu according to taste and/or food material characteristics of a user, and search for a corresponding recipe according to the menu selected by the user. The weighing unit is used to weigh a food material and a seasoning. The processing equipment is used to process and cook food and material. The central processor is separately connected with the recommendation unit, the weighing unit and the processing equipment, and is used to control the weighing unit and the processing equipment according to the menu and recipe recommended by the recommendation unit to coordinate the work and finish a cooking process. However, this intelligent kitchen cooking system mainly considers the menu, taste, and food materials, and does not involve cook's comfort.

SUMMARY

An objective of the present invention is to provide an intelligent cooking operation method, which resolves fatigue and health problems caused by the existing cooking operation in a standing manner.

To implement the foregoing objective, the intelligent cooking operation method provided by the present invention essentially changes an operation mode of traditional cooking. Based on an intelligent cooking technology and an Internet of Things technology using health big data, the intelligent cooking operation method jumps out of the traditional thinking mode of cooking in a standing manner and seeks for more suitable and reasonable operation, that is, a cooking operation manner changes from standing to sitting, which minimizes physical loss and muscle fatigue of a human body and frees fatigue and pressure of cooking, making cooking healthy and enjoyable.

Specifically, a technical solution of the present invention is as follows.

An intelligent cooking operation method is provided, where the method includes: providing a seat for a cook; forming, by a back of the seat, a swing connection by using a connecting rod, where the back swings in a horizontal direction with the cook according to a cooking operation trend of the cook, to support and protect back of the cook; forming a lifting and rotating connection between a cushion of the seat and a base of the seat through a support rod, wherein the cushion rises or rotates with the cook as a height of each operation unit changes, to support different cooking operation modes of the cook; disposing a control system on the seat, where the control system includes a processor, a voice signal receiving module communicatively connected with the processor, a voice command recognition module communicatively connected with the processor and configured to recognize a voice control command, a command transmission module communicatively connected with the processor and corresponding to each kitchen appliance, and a seat driving module communicatively connected with the processor and configured to drive the seat; driving, by the processor, the seat by using the seat driving module to each operation unit of a kitchen for cooking operation; separately disposing, in each kitchen appliance, a command receiving module communicatively connected with a start unit of each appliance; and sending, by the cook, one or more voice control commands of a kitchen appliance to the voice signal receiving module according to a cooking requirement, where the voice command recognition module recognizes the voice control commands and generates corresponding appliance voice command data, and the command transmission module sends a command signal to a command receiving module of the kitchen appliance that the voice control commands point to, to control the kitchen appliance.

Further, a pressure sensor communicatively connected with the processor is disposed in the back of the seat, pressure change data of the pressure sensor is transmitted to the processor, and the processor drives, based on the pressure change data, the connecting rod by using a seat back driving module disposed in the connecting rod to drive the back to swing in the horizontal direction, to support and protect back of the cook.

Further, a gravity sensor communicatively connected with the processor is disposed in the cushion of the seat, gravity change data of the gravity sensor is transmitted to the processor, and the processor drives, based on the gravity change data, the support rod by using a cushion driving module disposed in the support rod to drive the cushion to lift and rotate, to support the different cooking operation modes of the cook.

Further, a camera and/or a projector communicatively connected with the processor is disposed on the seat, the camera and/or the projector is communicated with the Internet of Things on a cloud, and the processor turns on the camera and/or the projector to record, share and upload a cooking process of the cook.

Further, a voice broadcast unit communicatively connected with the processor is disposed on the seat and a plurality of diet voice modules that store diet data of family members and friends of the cook are disposed in the voice broadcast unit, and the diet voice modules are communicatively connected with the voice command recognition module separately. The cook sends, according to a diet requirement of one or more family members or friends, a diet data voice command of the one or more family members or friends to the voice signal receiving module, the voice command recognition module recognizes the diet data voice command and generates corresponding diet voice command data, and a corresponding diet voice module of the voice broadcast unit plays diet data of a corresponding family member or friend for cooking reference for the cook.

Further, health data analysis modules communicatively connected with the diet voice modules respectively are disposed in the voice broadcast unit, the health data analysis modules respectively form corresponding healthy diet data according to the diet data in the diet voice modules, and the voice command recognition module plays healthy diet data of the corresponding member or friend by using the corresponding diet voice module of the voice broadcast unit for cooking reference for the cook.

Further, a position sensing module communicatively connected with the processor is disposed on the seat, and correspondingly, a position sensor communicatively connected with the position sensing module is separately disposed in each operation unit. A kitchen floor is provided with an annular slide rail corresponding to each operation unit in the kitchen, and the seat is slidably arranged on the slide rail. The processor is connected with a corresponding position sensor by using the position sensing module, and drives, according to a cooking process, the seat along the slide rail to a corresponding operation unit for cooking operation.

Further, the operation unit includes but is not limited to a washing unit, a processing unit, a cooking unit and a storage unit, and operating tables of the processing unit and the cooking unit are separately designed as a telescopic structure. The kitchen appliance includes an electric cooker, a pressure cooker, a refrigerator and a microwave oven, and accordingly the voice control command includes starting or turning off the electric cooker, starting or turning off the pressure cooker, opening or closing a door of the refrigerator, and starting or turning off the microwave oven.

Further, a plurality of wall cabinets are provided on a wall above each operation unit in the kitchen.

Further, the processor drives the seat by using the seat driving module to a living room, a bedroom, a study or a dining table.

Advantages of the present invention are as follows.

By studying dietary needs and cooking behavior in a kitchen, and based on pain of a user, a manner of cooking is essentially changed from standing to sitting, freeing cooking pressure and making people enjoy cooking healthily and easily.

A seat is designed with a sliding rail. In combination with application of a position sensing module and a position sensor and according to people's cooking habits and procedures, the seat is provided with an automatic positioning and shifting function (position sensing, that is, the seat is automatically positioned and shifted according to a cooking process) by considering a course of action and operations, so that a cook can easily and freely perform various cooking operations while sitting in the seat.

A pressure sensor on a back of the seat cooperates with a connecting rod and a seat back driving module, and the back of the seat swings with the cook during cooking. According to the ergonomic principle, the seat is designed according to postures and strength generated during cooking (the seat can automatically detect the body's operation trend, automatically adjust to match the body and support the body to reach an ideal state), so that any movement of people during operation in the kitchen is not restricted by sitting position and actual operation effect is affected, implementing support and protection of back of the cook.

A gravity sensor on a cushion is designed to match a cushion driving module in a support rod. Optimal operating heights of conventional operating tables of operation units in several cooking areas are different in different operation areas. According to ergonomics, unreasonable operating table height is very easy to cause fatigue and tension in waist and arm muscles. According to the ergonomic principle, the seat is designed to be more in line with physiological characteristics of the human body. According to each person's height characteristics and operating table requirements, the height can be automatically raised and lowered to meet actual operation height and improve comfort.

A voice signal receiving module, a voice command recognition module, a command transmission module, and command receiving modules respectively disposed in kitchen appliances are used cooperatively, which makes the seat perform voice recognition and response commands as a kitchen assistant, so that all kitchen appliances can be connected and controlled automatically.

The seat can be implanted with functions such as camera and projection, and can be connected to the Internet anytime and anywhere, entertaining and sharing cooking fun with family members and friends, and making the kitchen start with cooking but not only cooking, so that the kitchen will become a pleasant place of life and leisure.

The design of a diet voice module and a health data analysis module makes a cooking system change from a static auxiliary system to an Internet control system, and then upgrade an intelligent system of the Internet of Things, forming an efficient and convenient intelligent cooking ecosystem.

According to the ergonomic principle, the reasonable design and cooperation of kitchen facilities can make cooking operation in the sitting manner more comfortable. Reasonable layout of countertop design with less storage space at the lower part, or adopting a retractable operating countertop, or the like leaves enough space for legs during operation in the sitting manner. A cabinet can be designed with functions of lifting and stretching to increase a utilization rate of cabinet storage in other spaces such as a wall cupboard, improving scientific matching and application of the whole kitchen.

DETAILED DESCRIPTION OF THE EMBODIMENTS

The following further describes the present invention by using specific embodiments, but the embodiments do not limit the protection scope of the present invention.

Embodiment 1

Referring to FIG. 2 to FIG. 7, an intelligent cooking operation method is provided according to the present invention. The method includes; providing a seat 1 for a cook 100; forming, by a back 11 of the seat 1, a swing connection by using a connecting rod 12, where the back 11 swings in a horizontal direction with the cook 100 according to a cooking operation trend of the cook 100, to support and protect back of the cook 100; and forming a lifting and rotating connection between a cushion 13 of the seat 1 and a base 15 of the seat 1 through a support rod 14, where the cushion 13 rises or rotates with the cook 100 as a height of each operation unit changes, to support different cooking operation modes of the cook 100.

Figure 7:
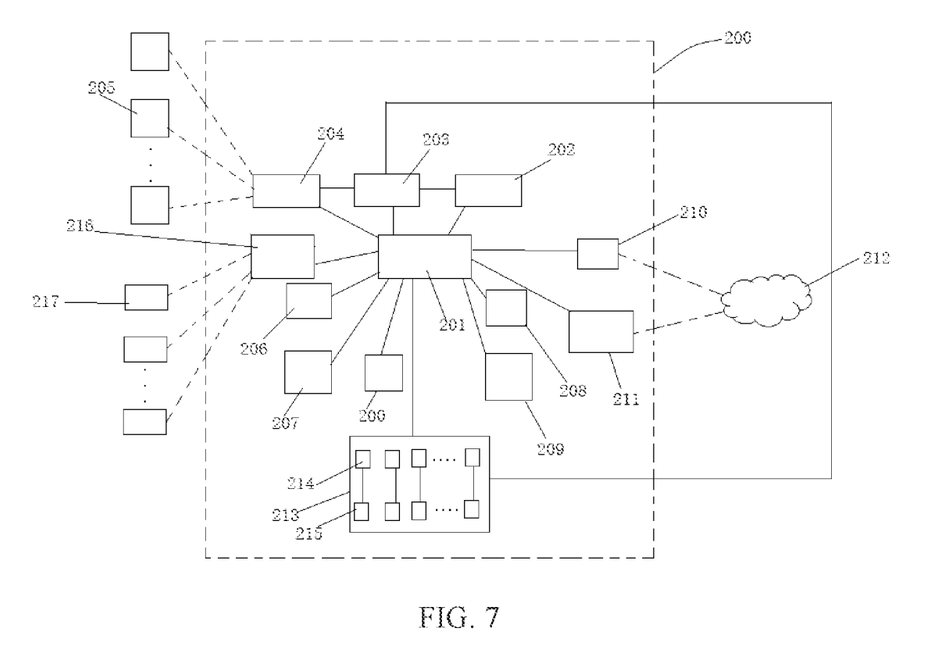
FIG. 7 is a schematic diagram of a control system in an intelligent cooking operation method according to the present invention.

A control system 200 is disposed on the seat 1. The control system 200 includes a processor 201, a voice signal receiving module 202 communicatively connected with the processor 201, a voice command recognition module 203 communicatively connected with the processor 201 and configured to recognize a voice control command, a command transmission module 204 communicatively connected with the processor 201 and corresponding to each kitchen appliance, and a seat driving module 200 communicatively connected with the processor 201 and configured to drive the seat 1. The processor 201 drives the seat by using the seat driving module 200 to each operation unit of a kitchen for cooking operation. A command receiving module 205 communicatively connected with a start unit (not shown) of each appliance is separately disposed in each kitchen appliance. The cook 100 sends one or more voice control commands of a kitchen appliance to the voice signal receiving module 202 according to a cooking requirement, the voice command recognition module 203 recognizes the voice control commands and generates corresponding appliance voice command data, and the command transmission module 204 sends a command signal to a command receiving module 205 of the kitchen appliance that the voice control commands point to, to control the kitchen appliance.

Figure 4:
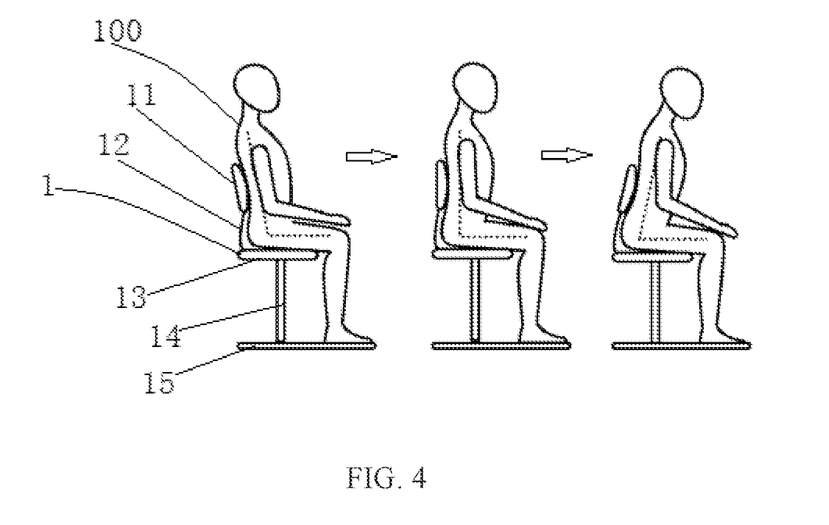
FIG. 4 is a schematic diagram of change of the back of a seat in an intelligent cooking operation method according to the present invention.

Further, a pressure sensor 206 communicatively connected with the processor 201 is disposed in the back 11 of the seat 1, pressure change data of the pressure sensor 206 is transmitted to the processor 201, and the processor 201 drives, based on the pressure change data, the connecting rod 12 by using a seat back driving module 207 disposed in the connecting rod 12 to drive the back 11 to swing in the horizontal direction, to support and protect back of the cook 100.

Figure 5:
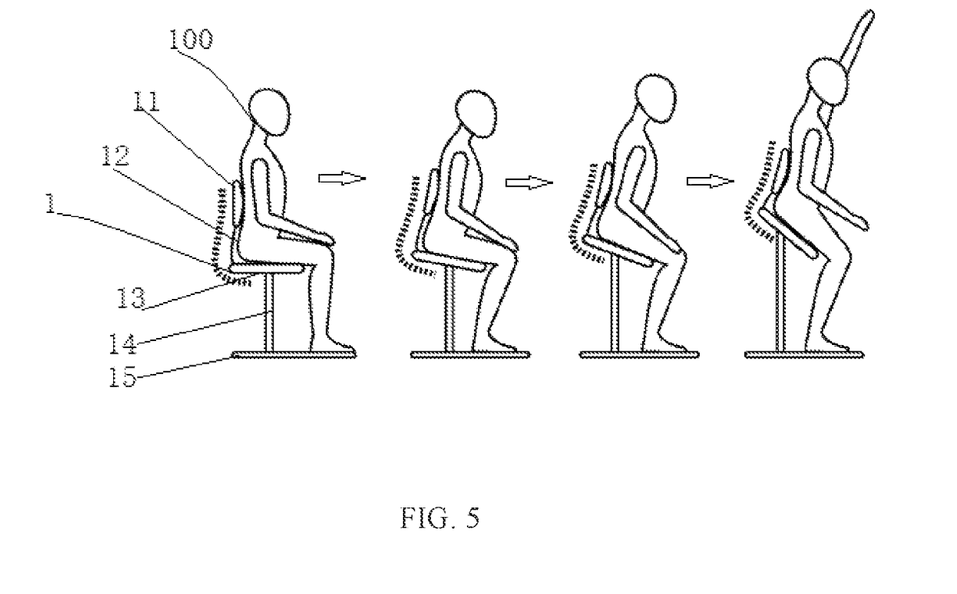
FIG. 5 is a schematic diagram of change of a cushion in an intelligent cooking operation method according to the present invention.

Further, a gravity sensor 208 communicatively connected with the processor 201 is disposed in the cushion 13 of the seat 1, gravity change data of the gravity sensor 208 is transmitted to the processor 201, and the processor 201 drives, based on the gravity change data, the cushion 13 by using a cushion driving module 209 disposed in the support rod 14 to lift and rotate, to support the different cooking operation modes of the cook 100.

Figure 6:
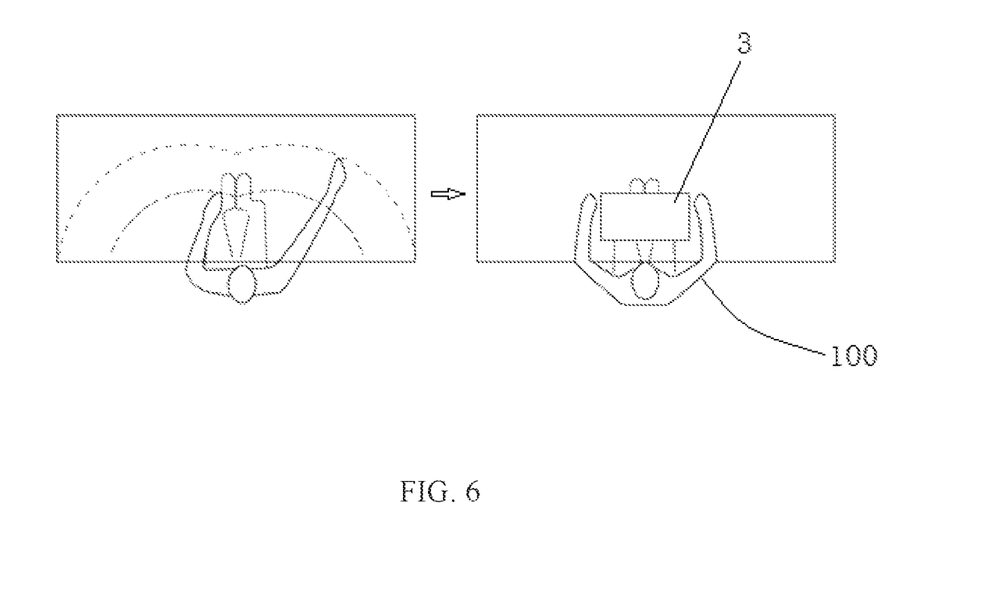
FIG. 6 is a schematic structural diagram of an operating table in an intelligent cooking operation method according to the present invention.

Further, the operation unit includes but is not limited to a washing unit, a processing unit, a cooking unit and/or a storage unit, and operating tables 3 of the processing unit and the cooking unit are separately designed as a telescopic structure. The kitchen appliance includes an electric cooker, a pressure cooker, a refrigerator and a microwave oven, and accordingly the voice control command includes starting or turning off the electric cooker, starting or turning off the pressure cooker, opening or closing a door of the refrigerator, and starting or turning off the microwave oven.

Embodiment 2

A camera 210 and/or a projector 211 communicatively connected with a processor 201 is disposed on a seat 1, the camera 210 and/or the projector 211 is communicated with the Internet of Things 212 on a cloud, and the processor 201 turns on the camera 210 and/or the projector 211 to record, share and upload a cooking process of a cook 100. Other features are the same as those in Embodiment 1, and are not described herein again.

Embodiment 3

A voice broadcast unit 213 communicatively connected with a processor 201 is disposed on a seat 1 and a plurality of diet voice modules 214 that store diet data of family members and friends of the cook are disposed in the voice broadcast unit 213, and the diet voice modules 214 are communicatively connected with the voice command recognition module 203 separately. The cook sends, according to a diet requirement of one or more family members or friends, a diet data voice command of the one or more family members or friends to a voice signal receiving module 202, the voice command recognition module 203 recognizes the diet data voice command and generates corresponding diet voice command data, and a corresponding diet voice module 214 of the voice broadcast unit 213 plays diet data of a corresponding family member or friend for cooking reference for a cook. Other features are the same as those in Embodiment 1, and are not described herein again.

Embodiment 4

Health data analysis modules 215 communicatively connected with diet voice modules 214 respectively are disposed in a voice broadcast unit 213, the health data analysis modules 215 respectively form corresponding healthy diet data according to the diet data in the diet voice modules 214, and a voice command recognition module 203 plays healthy diet data of a corresponding member or friend by using a corresponding diet voice module 214 of the voice broadcast unit 213 for cooking reference for a cook. Other features are the same as those in Embodiment 3, and are not described herein again.

Embodiment 5

A position sensing module 216 communicatively connected with a processor 201 is disposed on a seat 1, and correspondingly, a position sensor 217 communicatively connected with the position sensing module 216 is separately disposed in each operation unit. A kitchen floor is provided with an annular slide rail corresponding to each operation unit in a kitchen, and the seat is slidably arranged on the slide rail. The processor 201 is connected with a corresponding position sensor 217 by using the position sensing module 216, and drives, according to a cooking process, the seat 1 along the slide rail 2 to a corresponding operation unit for cooking operation. Other features are the same as those in Embodiment 1, and are not described herein again.

Although the present invention has been described above in detail with reference to general description and specific embodiments, some modifications or improvements can be made on the basis of the present invention, which is apparent to those skilled in the art. Therefore, these modifications or improvements made without departing from the spirit of the present invention shall fall within the protection scope of the present invention.

What is claimed is:

1. An intelligent cooking operation method, characterized in that, comprising:
providing a seat for a cook;
forming, by a back of the seat, a swing connection by using a connecting rod, wherein the back swings in a horizontal direction with the cook according to a cooking operation trend of the cook, to support and protect a back of the cook;
forming a lifting and rotating connection between a cushion of the seat and a base of the seat through a support rod, wherein the cushion rises or rotates with the cook as a height of each operation unit changes, to support different cooking operation modes of the cook;
disposing a control system on the seat, wherein the control system comprises a processor, a voice signal receiving module communicatively connected with the processor, a voice command recognition module communicatively connected with the processor and configured to recognize a voice control command, a command transmission module communicatively connected with the processor and corresponding to each kitchen appliance, and a seat driving module communicatively connected with the processor and configured to drive the seat;
driving, by the processor, the seat by using the seat driving module to the each operation unit of a kitchen for a cooking operation;
separately disposing, in the each kitchen appliance, a command receiving module communicatively connected with a start unit of the each kitchen appliance; and
sending, by the cook, one or more voice control commands of a kitchen appliance to the voice signal receiving module according to a cooking requirement, wherein the voice command recognition module recognizes the one or more voice control commands and generates appliance voice command data corresponding to the one or more voice control commands, and the command transmission module sends a command signal to the command receiving module of the kitchen appliance, to control the kitchen appliance, wherein the one or more voice control commands point to the command receiving module of the kitchen appliance;
wherein
a position sensing module communicatively connected with the processor is disposed on the seat, and a position sensor communicatively connected with the position sensing module is separately disposed in the each operation unit;
a kitchen floor is provided with an annular slide rail corresponding to the each operation unit in the kitchen, and the seat is slidably arranged on the annular slide rail;
the processor is connected with the position sensor corresponding to the processor by using the position sensing module, and the processor drives, according to a cooking process, the seat along the annular slide rail to an operation unit corresponding to the cooking process for the cooking operation;
the operation unit comprises a washing unit, a processing unit, a cooking unit or a storage unit, and operating tables of the processing unit and the cooking unit are separately designed as a telescopic structure;
the kitchen appliance comprises an electric cooker, a pressure cooker, a refrigerator and a microwave oven, and the one or more voice control commands comprise: starting or turning off the electric cooker, starting or turning off the pressure cooker, opening or closing a door of the refrigerator, and starting or turning off the microwave oven;
a pressure sensor communicatively connected with the processor is disposed in the back of the seat, pressure change data of the pressure sensor is transmitted to the processor, and the processor drives, based on the pressure change data, the connecting rod by using a seat back driving module disposed in the connecting rod to drive the back of the seat to swing in the horizontal direction, to support and protect the back of the cook;
a gravity sensor communicatively connected with the processor is disposed in the cushion of the seat, gravity change data of the gravity sensor is transmitted to the processor, and the processor drives, based on the gravity change data, the support rod by using a cushion driving module disposed in the support rod to drive the cushion to lift and rotate, to support the different cooking operation modes of the cook;
the processor drives the seat by using the seat driving module to a living room, a bedroom, a study or a dining table;
a camera and/or a projector communicatively connected with the processor are/is disposed on the seat, the camera and/or the projector are/is communicated with Internet of Things on a cloud, and the processor turns on the camera and/or the projector to record, share and upload the cooking process of the cook;
a voice broadcast unit communicatively connected with the processor is disposed on the seat, and a plurality of diet voice modules are disposed in the voice broadcast unit, wherein diet data of a plurality of family members and a plurality of friends of the cook are stored in the plurality of diet voice modules, and the plurality of diet voice modules are communicatively connected with the voice command recognition module separately;
the cook sends, according to a diet requirement of one or more family members of the plurality of family members or one or more friends of the plurality of friends, a diet data voice command of the one or more family members or the one or more friends to the voice signal receiving module, the voice command recognition module recognizes the diet data voice command and generates diet voice command data corresponding to the diet data voice command, and a diet voice module of the plurality of diet voice modules corresponding to the voice broadcast unit plays diet data of the one or more family members or the one or more friends for a first cooking reference for the cook; and health data analysis modules communicatively connected with the plurality of diet voice modules are respectively disposed in the voice broadcast unit, the health data analysis modules respectively form healthy diet data according to the diet data in the plurality of diet voice modules, and the voice command recognition module plays healthy diet data corresponding to the one or more family members or the one or more friends by using the plurality of diet voice modules of the voice broadcast unit for a second cooking reference for the cook.

2. The intelligent cooking operation method according to claim 1, wherein a plurality of wall cabinets are provided on a wall above the each operation unit in the kitchen.

* * * * *